(12) United States Patent
Huang et al.

(10) Patent No.: US 12,284,049 B2
(45) Date of Patent: *Apr. 22, 2025

(54) METHODS AND APPARATUS FOR POWER EFFICIENT BROADCASTING AND COMMUNICATION SYSTEMS

(71) Applicant: Neo Wireless LLC, Wayne, PA (US)

(72) Inventors: Haiming Huang, Bellevue, WA (US); Xiaodong Li, Kirkland, WA (US); Titus Lo, Bellevue, WA (US); Kemin Li, Bellevue, WA (US)

(73) Assignee: Neo Wireless LLC, Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,882

(22) Filed: May 1, 2020

(65) Prior Publication Data

US 2020/0259676 A1 Aug. 13, 2020

Related U.S. Application Data

(60) Continuation of application No. 15/724,228, filed on Oct. 3, 2017, now abandoned, which is a continuation
(Continued)

(51) Int. Cl.
*H04L 12/18* (2006.01)
*H04L 5/00* (2006.01)
(Continued)

(52) U.S. Cl.
CPC ........ *H04L 12/1881* (2013.01); *H04L 5/0007* (2013.01); *H04L 5/005* (2013.01);
(Continued)

(58) Field of Classification Search
CPC . H04L 12/1881; H04L 5/0007; H04L 12/189; H04L 5/14; H04W 72/005; H04W 52/0216
See application file for complete search history.

(56) References Cited

U.S. PATENT DOCUMENTS 5,170,413 A 12/1992 Hess et al.
5,506,615 A 4/1996 Awaji
(Continued)

FOREIGN PATENT DOCUMENTS

CN 1332556 A 1/2002
CN 1571512 1/2005
(Continued)

OTHER PUBLICATIONS

Final Office Action for U.S. Appl. No. 11/571,469, Mail Date Dec. 1, 2010, 20 pages.
(Continued)

*Primary Examiner* — Jason E Mattis
*Assistant Examiner* — Bao G Nguyen
(74) *Attorney, Agent, or Firm* — Volpe Koenig

(57) ABSTRACT

A method for receiving broadcast information in an OFDM communication system may comprise receiving, by a mobile station, a periodically broadcast scheduling message from a base station. The periodically broadcast scheduling message may be an OFDM signal which indicates for each type of a plurality of types of broadcast information included in broadcast information, a pattern of frames to monitor for the type of broadcast information. The periodically broadcast scheduling message may also indicate a length of time to monitor. The method may further comprise monitoring and receiving, by the mobile station, information for at least one of the plurality of types of broadcast information, based on the periodically broadcast scheduling message.

38 Claims, 13 Drawing Sheets

Related U.S. Application Data of application No. 14/596,109, filed on Jan. 13, 2015, now Pat. No. 9,780,959, which is a continuation of application No. 13/712,848, filed on Dec. 12, 2012, now Pat. No. 8,934,394, which is a division of application No. 13/422,829, filed on Mar. 16, 2012, now Pat. No. 8,457,081, which is a continuation of application No. 11/571,469, filed as application No. PCT/US2006/022376 on Jun. 6, 2006, now Pat. No. 8,155,098.

(60) Provisional application No. 60/688,937, filed on Jun. 9, 2005.

(51) Int. Cl.
| | | |
|---|---|---|
| H04L 5/14 | (2006.01) | |
| H04N 21/2385 | (2011.01) | |
| H04N 21/262 | (2011.01) | |
| H04N 21/442 | (2011.01) | |
| H04N 21/61 | (2011.01) | |
| H04N 21/658 | (2011.01) | |
| H04W 52/02 | (2009.01) | |
| H04W 72/0446 | (2023.01) | |
| H04W 72/30 | (2023.01) | |
| H04L 1/00 | (2006.01) | |
| H04L 1/18 | (2023.01) | |
| H04W 72/04 | (2023.01) | |
| H04W 84/04 | (2009.01) | |
| H04W 92/10 | (2009.01) | |

(52) U.S. Cl.
CPC .............. *H04L 5/14* (2013.01); *H04L 12/189* (2013.01); *H04N 21/2385* (2013.01); *H04N 21/26208* (2013.01); *H04N 21/44209* (2013.01); *H04N 21/6131* (2013.01); *H04N 21/6582* (2013.01); *H04W 52/0216* (2013.01); *H04W 72/0446* (2013.01); *H04W 72/30* (2023.01); *H04L 1/0003* (2013.01); *H04L 1/0061* (2013.01); *H04L 2001/0093* (2013.01); *H04L 1/18* (2013.01); *H04W 72/04* (2013.01); *H04W 84/042* (2013.01); *H04W 92/10* (2013.01); *Y02D 30/70* (2020.08)

(56) References Cited

U.S. PATENT DOCUMENTS

| | | |
|---|---|---|
| 5,659,545 A | 8/1997 | Sowles et al. |
| 5,726,978 A | 3/1998 | Frodigh et al. |
| 5,734,444 A | 3/1998 | Yoshinobu |
| 5,794,116 A | 8/1998 | Matsuda et al. |
| 5,878,324 A | 3/1999 | Borth et al. |
| 5,898,338 A | 4/1999 | Proctor et al. |
| 5,929,704 A | 7/1999 | Proctor et al. |
| 6,023,725 A * | 2/2000 | Ozawa ................. H04N 21/242 709/219 |
| 6,052,145 A | 4/2000 | Macrae et al. |
| 6,078,216 A | 6/2000 | Proctor |
| 6,081,697 A | 6/2000 | Haartsen |
| 6,115,390 A | 9/2000 | Chuah |
| 6,201,970 B1 | 3/2001 | Suzuki et al. |
| 6,256,509 B1 | 7/2001 | Tanaka et al. |
| 6,292,474 B1 | 9/2001 | Ali et al. |
| 6,370,153 B1 | 4/2002 | Eng |
| 6,381,250 B1 | 4/2002 | Jacobson et al. |
| 6,493,331 B1 | 12/2002 | Walton et al. |
| 6,529,146 B1 | 3/2003 | Kowalski et al. |
| 6,603,979 B1 | 8/2003 | Hirsch |
| 6,690,659 B1 | 2/2004 | Ahmed et al. |
| 6,701,528 B1 | 3/2004 | Arsenault et al. |
| 6,771,660 B1 | 8/2004 | Bourlas et al. |
| 6,788,959 B2 | 9/2004 | Jokinen et al. |
| 6,836,664 B2 | 12/2004 | McGovern et al. |
| 6,886,042 B1 | 4/2005 | Watahiki et al. |
| 6,904,550 B2 | 6/2005 | Sibecas et al. |
| 6,950,624 B2 | 9/2005 | Kim et al. |
| 6,965,580 B1 | 11/2005 | Takagi et al. |
| 7,031,348 B1 | 4/2006 | Gazit |
| 7,050,511 B2 | 5/2006 | Jeong et al. |
| 7,085,576 B2 | 8/2006 | Ranganathan |
| 7,142,864 B2 | 11/2006 | Laroia et al. |
| 7,184,726 B2 | 2/2007 | Shibata |
| 7,197,025 B2 | 3/2007 | Chuah |
| 7,200,124 B2 | 4/2007 | Kim et al. |
| 7,203,158 B2 | 4/2007 | Oshima et al. |
| 7,260,079 B1 | 8/2007 | Chapman et al. |
| 7,324,832 B2 | 1/2008 | van Rooyen |
| 7,336,646 B2 | 2/2008 | Muller |
| 7,339,882 B2 | 3/2008 | Schaefer et al. |
| 7,352,722 B2 | 4/2008 | Malladi et al. |
| 7,391,751 B2 | 6/2008 | Lee et al. |
| 7,406,104 B2 | 7/2008 | Yang et al. |
| 7,418,193 B2 | 8/2008 | Miyagawa et al. |
| 7,428,385 B2 | 9/2008 | Lee et al. |
| 7,500,261 B1 | 3/2009 | Myers |
| 7,548,506 B2 | 6/2009 | Ma et al. |
| 7,630,356 B2 | 12/2009 | Zhang |
| 7,633,971 B1 | 12/2009 | Butler et al. |
| 7,660,229 B2 | 2/2010 | Papasakellariou et al. |
| 7,680,094 B2 | 3/2010 | Liu |
| 7,683,664 B1 | 3/2010 | Gaide |
| 7,684,807 B2 | 3/2010 | Schmidt |
| 7,734,762 B2 | 6/2010 | Hundscheidt et al. |
| 7,801,490 B1 | 9/2010 | Scherzer |
| 7,961,609 B2 | 6/2011 | Teague et al. |
| 8,014,264 B2 | 9/2011 | Li et al. |
| 8,046,801 B2 | 10/2011 | Ellis et al. |
| 8,089,911 B2 | 1/2012 | Huang et al. |
| 8,155,098 B2 | 4/2012 | Huang et al. |
| 8,194,574 B2 | 6/2012 | Shinozaki |
| 8,374,115 B2 | 2/2013 | Huang et al. |
| 8,400,951 B2 | 3/2013 | Nangia et al. |
| 8,514,793 B2 | 8/2013 | Gauvreau et al. |
| 8,547,883 B2 | 10/2013 | Jung et al. |
| 8,547,884 B2 | 10/2013 | Lo et al. |
| 8,553,589 B2 | 10/2013 | Hui et al. |
| 8,582,592 B2 | 11/2013 | Gorokhov et al. |
| 8,687,608 B2 | 4/2014 | Soliman |
| 9,363,066 B2 | 6/2016 | Lo et al. |
| 10,638,468 B2 | 4/2020 | Nelson et al. |
| 2001/0017853 A1 | 8/2001 | Kikuchi et al. |
| 2001/0039663 A1 | 11/2001 | Sibley |
| 2001/0041594 A1* | 11/2001 | Arazi ................. H04M 1/733 455/555 |
| 2001/0055322 A1* | 12/2001 | Domon ................. H04L 49/3081 370/537 |
| 2002/0031097 A1 | 3/2002 | Jung |
| 2002/0080887 A1 | 6/2002 | Jeong et al. |
| 2002/0118666 A1 | 8/2002 | Stanwood et al. |
| 2002/0122406 A1 | 9/2002 | Chillariga et al. |
| 2002/0126780 A1 | 9/2002 | Oshima et al. |
| 2002/0147978 A1 | 10/2002 | Dolgonos et al. |
| 2002/0150387 A1 | 10/2002 | Kunii et al. |
| 2002/0162114 A1 | 10/2002 | Bisher, Jr. et al. |
| 2002/0163695 A1 | 11/2002 | Unitt et al. |
| 2002/0166128 A1* | 11/2002 | Ikeda ................. H04N 21/4524 725/112 |
| 2002/0183026 A1 | 12/2002 | Naruse |
| 2003/0032389 A1 | 2/2003 | Kim et al. |
| 2003/0037331 A1 | 2/2003 | Lee |
| 2003/0045254 A1 | 3/2003 | Shibata |
| 2003/0072255 A1 | 4/2003 | Ma et al. |
| 2003/0076812 A1 | 4/2003 | Benedittis |
| 2003/0117980 A1 | 6/2003 | Kim et al. |
| 2003/0119452 A1 | 6/2003 | Kim et al. |
| 2003/0125025 A1 | 7/2003 | Lim |
| 2003/0152094 A1 | 8/2003 | Colavito et al. |
| 2003/0206541 A1 | 11/2003 | Yun et al. |
| 2003/0207696 A1 | 11/2003 | Willenegger et al. |
| 2003/0214928 A1 | 11/2003 | Chuah |

(56) References Cited

U.S. PATENT DOCUMENTS

| | | |
|---|---|---|
| 2003/0224731 A1 | 12/2003 | Yamaura et al. |
| 2004/0001429 A1 | 1/2004 | Ma et al. |
| 2004/0032836 A1 | 2/2004 | Grilli et al. |
| 2004/0062222 A1 | 4/2004 | Seidel et al. |
| 2004/0082356 A1 | 4/2004 | Walton et al. |
| 2004/0120285 A1 | 6/2004 | Paila et al. |
| 2004/0131084 A1 | 7/2004 | Bing et al. |
| 2004/0141502 A1 | 7/2004 | Corson et al. |
| 2004/0184471 A1 | 9/2004 | Chuah et al. |
| 2004/0192342 A1 | 9/2004 | Ranganathan |
| 2004/0224691 A1 | 11/2004 | Hadad |
| 2004/0259503 A1* | 12/2004 | Ogura ............... H04W 36/30 455/67.11 |
| 2005/0025039 A1 | 2/2005 | Hwang et al. |
| 2005/0028208 A1 | 2/2005 | Ellis et al. |
| 2005/0037795 A1* | 2/2005 | Aaltonen ........... H04N 21/235 348/E5.006 |
| 2005/0055723 A1 | 3/2005 | Atad et al. |
| 2005/0063345 A1 | 3/2005 | Wu et al. |
| 2005/0068990 A1 | 3/2005 | Liu |
| 2005/0078680 A1* | 4/2005 | Barrett .............. H04N 21/6405 348/E5.008 |
| 2005/0085197 A1* | 4/2005 | Laroia ................ H04B 7/0691 455/562.1 |
| 2005/0085214 A1 | 4/2005 | Laroia et al. |
| 2005/0108763 A1 | 5/2005 | Baran et al. |
| 2005/0111397 A1 | 5/2005 | Attar et al. |
| 2005/0113099 A1 | 5/2005 | Eriksson et al. |
| 2005/0128993 A1 | 6/2005 | Yu et al. |
| 2005/0129058 A1* | 6/2005 | Casaccia ............ H04W 84/12 370/464 |
| 2005/0135295 A1 | 6/2005 | Walton et al. |
| 2005/0135416 A1 | 6/2005 | Ketchum et al. |
| 2005/0141475 A1 | 6/2005 | Vijayan et al. |
| 2005/0152409 A1 | 7/2005 | Zhao et al. |
| 2005/0152697 A1 | 7/2005 | Lee et al. |
| 2005/0174964 A1 | 8/2005 | Orlik et al. |
| 2005/0175070 A1 | 8/2005 | Grob et al. |
| 2005/0193309 A1 | 9/2005 | Grilli et al. |
| 2005/0195823 A1 | 9/2005 | Chen et al. |
| 2005/0204388 A1 | 9/2005 | Knudson et al. |
| 2005/0254427 A1 | 11/2005 | Leon et al. |
| 2005/0265280 A1 | 12/2005 | Roh et al. |
| 2006/0007930 A1 | 1/2006 | Dorenbosch |
| 2006/0013168 A1* | 1/2006 | Agrawal .............. H04W 88/10 370/335 |
| 2006/0013325 A1 | 1/2006 | Agrawal et al. |
| 2006/0018347 A1 | 1/2006 | Agrawal |
| 2006/0019677 A1 | 1/2006 | Teague et al. |
| 2006/0069799 A1 | 3/2006 | Hundscheidt et al. |
| 2006/0088023 A1 | 4/2006 | Muller |
| 2006/0098567 A1 | 5/2006 | Willenegger et al. |
| 2006/0098676 A1 | 5/2006 | Cai et al. |
| 2006/0128428 A1 | 6/2006 | Rooyen |
| 2006/0146745 A1* | 7/2006 | Cai .................... H04W 72/30 370/328 |
| 2006/0146822 A1 | 7/2006 | Kolakowski et al. |
| 2006/0146853 A1 | 7/2006 | Paila |
| 2006/0176966 A1 | 8/2006 | Stewart et al. |
| 2006/0182022 A1* | 8/2006 | Abedi ............... H04W 72/1278 370/310 |
| 2006/0193338 A1 | 8/2006 | Zheng et al. |
| 2006/0198325 A1 | 9/2006 | Gao et al. |
| 2006/0211436 A1* | 9/2006 | Paila ................... H04H 20/18 455/509 |
| 2006/0223520 A1* | 10/2006 | Laroia ................ H04W 52/143 455/422.1 |
| 2006/0251045 A1 | 11/2006 | Okubo |
| 2006/0256884 A1 | 11/2006 | Tomioka et al. |
| 2007/0002858 A1 | 1/2007 | Bichot et al. |
| 2007/0058595 A1 | 3/2007 | Classon et al. |
| 2007/0064588 A1 | 3/2007 | Kisoda et al. |
| 2007/0081538 A1 | 4/2007 | Ganji |
| 2007/0218889 A1 | 9/2007 | Zhang |
| 2008/0130483 A1 | 6/2008 | Khandekar et al. |
| 2008/0137562 A1 | 6/2008 | Li et al. |
| 2008/0170530 A1 | 7/2008 | Connors et al. |
| 2009/0023469 A1 | 1/2009 | Tomioka et al. |
| 2009/0028109 A1 | 1/2009 | Huang et al. |
| 2009/0067403 A1 | 3/2009 | Chan et al. |
| 2009/0215499 A1 | 8/2009 | Moon et al. |
| 2009/0258628 A1 | 10/2009 | Lindoff et al. |
| 2010/0067465 A1 | 3/2010 | Miki et al. |
| 2010/0130137 A1 | 5/2010 | Pelletier et al. |
| 2010/0165893 A1 | 7/2010 | Edwards |
| 2010/0173586 A1 | 7/2010 | McHenry et al. |
| 2010/0227622 A1 | 9/2010 | Mody et al. |
| 2010/0265905 A1 | 10/2010 | Lee et al. |
| 2011/0002311 A1 | 1/2011 | Wang et al. |
| 2011/0026422 A1* | 2/2011 | Ma ..................... H04L 5/0053 370/252 |
| 2011/0103243 A1 | 5/2011 | Larsson et al. |
| 2011/0194515 A1 | 8/2011 | Nakao et al. |
| 2011/0267978 A1 | 11/2011 | Etemad |
| 2012/0063381 A1 | 3/2012 | Huang et al. |
| 2012/0176952 A1 | 7/2012 | Huang et al. |
| 2012/0230265 A1 | 9/2012 | Lee et al. |
| 2012/0257551 A1 | 10/2012 | Diao et al. |
| 2012/0269148 A1 | 10/2012 | Hultell et al. |
| 2012/0327897 A1 | 12/2012 | Huang et al. |
| 2013/0012191 A1 | 1/2013 | Charbit et al. |
| 2013/0121232 A1 | 5/2013 | Huang et al. |
| 2013/0343239 A1 | 12/2013 | Damnjanovic et al. |
| 2014/0254609 A1 | 9/2014 | Petry et al. |
| 2014/0321351 A1* | 10/2014 | Kim ................... H04L 12/189 370/312 |
| 2016/0286556 A1 | 9/2016 | Lo et al. |
| 2021/0195556 A1* | 6/2021 | Huang ............... H04L 12/189 |

FOREIGN PATENT DOCUMENTS

| | | |
|---|---|---|
| CN | 1571531 A | 1/2005 |
| CN | 1678068 | 10/2005 |
| CN | 101197655 A | 6/2008 |
| KR | 20050053377 A | 6/2005 |
| WO | 2002/05506 A2 | 1/2002 |
| WO | 2006/001671 A1 | 1/2006 |
| WO | 2006/086878 A1 | 8/2006 |
| WO | 2007/052995 A1 | 5/2007 |

OTHER PUBLICATIONS

International Search Report and Written Opinion for International Application No. PCT/US06/22376, Filed Jun. 6, 2006, Applicant: Neocific, Inc., Mailed Mar. 27, 2007, 8 pages.

International Search Report and Written Opinion for International Application No. PCT/US06/11088, filed Mar. 24, 2006, Application Neocific, Inc., Mailed Jul. 28, 2006, 9 pages.

Non-Final Office Action for U.S. Appl. No. 13/422,829, Date Mailed Jan. 31, 2013, 13 pages.

Notice of Allowance for U.S. Appl. No. 11/571,469, Date Mailed Feb. 21, 2012, 9 pages.

Notice of Allowance for U.S. Appl. No. 13/422,829, Mail Date Apr. 12, 2013, 12 pages.

Third Generation Partnership Project, "Technical Specification Group Services and System Aspects; Multimedia Broadcast/Multicast Service (MBMS); Protocols and codecs (Release 6)," 3GPP TS 26.346 V6.0.0 (Mar. 2005).

Third Generation Partnership Project, "Technical Specification Group Services and System Aspects; Multimedia Broadcast/Multicast Service (MBMS); Protocols and codecs (Release 6)," 3GPP TS 26.346 V6.4.0 (Mar. 2006).

Baxley et al., "Power Savings Analysis of Peak-to-Average Power Ratio Reduction in OFDM," IEEE Transactions on Consumer Electronics, vol. 50, No. 3 (Aug. 2004).

Guo et al., "Reducing Peak-to-Average Power Ratio in OFDM Systems by Adaptive Dynamic Range Companding," 2002 World Wireless Congress, San Francisco, CA (2002).

Koffman et al., "Broadband Wireless Access Solutions Based on OFDM Access in IEEE 802.16," IEEE Communications Magazine, pp. 96-103 (Apr. 2002).

(56) References Cited

OTHER PUBLICATIONS

*Neo Wireless LLC* v. *Apple Inc.*, Apple Inc's Answer to Plaintiff's First Amended Complaint, Civil Action No. 6:21-cv-00026-ADA (Jun. 17, 2021).
*Neo Wireless LLC* v. *Apple Inc.*, Plaintiff's First Amended Complaint, Civil Action No. 6:21-cv-0026 (Apr. 28, 2021).
*Neo Wireless LLC* v. *Dell Technologies Inc. et al.*, Declaration of Roger Fulgham in Support of Defendants' Opening Claim Construction, Civil Action No. 6:21-cv-0024 (Oct. 28, 2021).
*Neo Wireless LLC* v. *Dell Technologies Inc. et al.*, Declaration of James Proctor in Support of Defendants' Opening Claim Construction Brief, Civil Action No. 6:21-cv-0024 (Oct. 27, 2021).
*Neo Wireless LLC* v. *Dell Technologies Inc. et al.*, Declaration of William Alberth in Support of Neo Wireless's Responsive Claim Construction Brief, Civil Action No. 6:21-cv-0024 (Nov. 18, 2021).
*Neo Wireless LLC* v. *Dell Technologies Inc. et al.*, Defendant's Answer, Affirmative Defenses, and Counterclaims to Plaintiff's First Amended Complaint, Civil Action No. 6:21-cv-0024 (Jun. 18, 2021).
*Neo Wireless LLC* v. *Dell Technologies Inc. et al.*, Defendants' Opening Claim Construction Brief, Civil Action No. 6:21-cv-0024 (Oct. 28, 2021).
*Neo Wireless LLC* v. *Dell Technologies Inc. et al.*, Neo Wireless's Answer to Dell's Counterclaims, Civil Action No. 6:21-cv-0024 (Jul. 9, 2021).
*Neo Wireless LLC* v. *Dell Technologies Inc. et al.*, Plaintiff Neo Wireless LLC's Responsive Claim Construction Brief, Civil Action No. 6:21-cv-0024 (Nov. 18, 2021).
*Neo Wireless LLC* v. *Dell Technologies Inc. et al.*, Stipulated Constructions, Civil Action No. 6:21-cv-0024 (Oct. 27, 2021).
*Neo Wireless LLC* v. *Dell Technologies, Inc. et al.*, Plaintiff's First Amended Complaint, Civil Action No. 6:21-cv-0024 (Apr. 28, 2021).
*Neo Wireless LLC* v. *LG Electrincs Inc.*, Defendant LG's Answer to Plaintiff's First Amended Complaint, Civil Action No. 6:21-cv-00025-ADA (Jun. 17, 2021).
*Neo Wireless LLC* v. *LG Electronics, Inc. et al.*, Plaintiff's First Amended Complaint, Civil Action No. 6:21-cv-0025 (Apr. 28, 2021).
Panta et al., "Use of Peak-to-Average Power Reduction Technique in HIPERLAN2 and its Performance in a Fading Channel." Proc. 6th International Symposium on DSP for Communication Systems, pp. 113-117, (2002).
Prasad, "Chapter 6—The Peak Power Problem," in OFDM for Wireless Communications Systems, Artech House (2004).
Van Nee et al., OFDM for Wireless Multimedia Communications, Artech House (2000).
You et al., "A Simple Construction of OFDM-CDMA Signals with Low Peak-to-Average Power Ratio," IEEE Transactions on Broadcasting, vol. 49, No. 4 (Dec. 2003).
*Neo Wireless LLC* v. *Dell Technologies Inc. et al.*, Defendants' Reply Claim Construction Brief, Civil Action No. 6:21-cv-0024 (Dec. 2, 2021).
*Neo Wireless LLC* v. *Dell Technologies Inc. et al.*, Supplemental Declaration of James Proctor in Support of Defendants' Reply Claim Construction Brief, Civil Action No. 6:21-cv-0024 (Dec. 2, 2021).
*Neo Wireless LLC* v. *Dell Technologies Inc. et al.*, Plaintiff Neo Wireless LLC's Claim Construction Sur Reply Brief, Civil Action No. 6:21-cv-0024 (Dec. 16, 2021).
*Neo Wireless LLC* v. *Dell Technologies Inc. et al.*, Joint Claim Construction Statement, Civil Action No. 6:21-cv-0024 (Dec. 21, 2021).
IEEE Standard for Information technology—Telecommunications and information exchange between systems—Local and metropolitan area networks—Specific requirements; Part 11: Wireless LAN Medium Access Control (MAC) and Physical Layer (PHY) specifications Amendment 4: Further Higher Data Rate Extension in the 2.4 GHz Band, IEEE Std 802.11g-2003 (Jun. 27, 2003).
IEEE Standard for Local and metropolitan area networks; Part 16: Air Interface for Fixed Broadband Wireless Access Systems—Amendment 2: Physical and Medium Access Control Layers for Combined Fixed and Mobile Operation in Licensed Bands and Corrigendum 1, IEEE Std. 802.16e-2005 (Feb. 28, 2006).
Johnson et al., Telecommunication Breakdown Concepts of Communication Transmitted via Software Defined Radio, 2004, Pearson Prentice Hall, pp. 43-48 and 81-82.
Lathi, Modern Digital and Analog Communication Systems 3rd Edition, 1998, Oxford University Press, pp. 189-191.
Supplement to IEEE Standard for Information technology—Telecommunications and information exchange between systems—Local and metropolitan area networks—Specific requirements; Part 11: Wireless LAN Medium. Access Control (MAC) and. Physical Layer (PHY) specifications High-speed Physical Layer in the 5 GHz Band, IEEE Std 802.11a-1999(R2003) (Jun. 12, 2003).
Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band, IEEE Std 802.11b-1999 (R2003) (Jun. 12, 2003).
Definition of "frequency-division multiplexing," McGraw-Hill, Dictionary of Scientific and Technical Terms, 6th Edition (2003).
*Dell Technologies Inc. et al.* v. *Neo Wireless LLC*, Declaration of Dr. Ding, IPR 2022-00616 (Feb. 18, 2022).
*Dell Technologies Inc. et al.* v. *Neo Wireless LLC*, Petition for Inter Partes Review of U.S. Pat. No. 10,044,517 pursuant to 35 U.S.C. §§ 311-219, 37 C.F.R. §42, IPR 2022-00616 (Feb. 18, 2022).
*Neo Wireless LLC* v. *American Honda Motor Co., Inc. et al.*, Plaintiff NEO Wireless LLC's Complaint for Patent Infringement, United States District Court for the Southern District of Ohio Eastern Division at Columbus, Case No. 2:22-cv-01824-EAS-KAJ (Mar. 29, 2022).
*Neo Wireless LLC* v. *Dell Technologies Inc. et al.*, Plaintiff Neo Wireless LLC's Response to Defendants' Supplemental Claim Construction Brief, C.A. No. 1:22-cv-60-DAE (Jun. 8, 2022).
*Neo Wireless LLC* v. *Ford Motor Company*, Plaintiff NEO Wireless LLC's Complaint for Patent Infringement, United States District Court for the Western District of Missouri Western Division, Case No. 4:22-cv-00210-GAF (Mar. 29, 2022).
*Neo Wireless LLC* v. *General Motors Company et al.*, Plaintiff NEO Wireless LLC's Complaint for Patent Infringement, United States District Court for the Eastern District of Texas Marshall Division, Case No. 2:22-cv-00094 (Mar. 29, 2022).
*Neo Wireless LLC* v. *Nissan North America Inc. et al.*, Plaintiff NEO Wireless LLC's Complaint for Patent Infringement, United States District Court for the Middle District of Tennessee Nashville Division, Case No. 3:22-cv-00220 (Mar. 29, 2022).
*Neo Wireless LLC* v. *Tesla Inc.*, Plaintiff NEO Wireless LLC's Complaint for Patent Infringement, United States District Court for the Eastern District of Texas Marshall Division, Case No. 2:22-cv-00095 (Mar. 29, 2022).
*Neo Wireless LLC* v. *Toyota Motor North America, Inc. et al.*, Plaintiff NEO Wireless LLC's Complaint for Patent Infringement, United States District Court for the Eastern District of Texas Marshall Division, Case No. 2:22-cv-00093 (Mar. 29, 2022).
*Neo Wireless LLC* v. *Volkswagen Group of America, Inc., et al.*, Plaintiff NEO Wireless LLC's Complaint for Patent Infringement, United States District Court for the Eastern District of Tennessee Chattanooga District, Case No. 1:22-cv-00076 (Mar. 29, 2022).
*Neo Wireless, LLC* v. *Dell Technologies Inc. et al.*, Defendants' Supplemental Claim Construction Brief, Civil Action No. 1:22-cv-00060-DAE (May 18, 2022).

\* cited by examiner

METHODS AND APPARATUS FOR POWER EFFICIENT BROADCASTING AND COMMUNICATION SYSTEMS

CROSS-REFERENCE TO RELATED APPLICATION(S)

This application is a continuation of U.S. patent application Ser. No. 15/724,228, filed Oct. 3, 2017, which is a continuation of U.S. patent application Ser. No. 14/596,109, filed on Jan. 13, 2015, which issued as U.S. Pat. No. 9,780,959 on Oct. 3, 2017 which is a continuation of U.S. patent application Ser. No. 13/712,848, filed Dec. 12, 2012, which issued as U.S. Pat. No. 8,934,394, on Jan. 13, 2015 which is a divisional of Ser. No. 13/422,829, filed Mar. 16, 2012, which issued as U.S. Pat. No. 8,457,081, on Jun. 4, 2013 which is a continuation of U.S. patent application Ser. No. 11/571,469, filed Oct. 9, 2008, which issued as U.S. Pat. No. 8,155,098, on Apr. 10, 2012, which is a National Stage application of PCT/US06/22376, filed Jun. 6, 2006, which claims priority from U.S. Patent Application No. 60/688,937, filed on Jun. 9, 2005, which are incorporated by reference as if fully set forth.

FIELD OF THE INVENTION

The disclosed embodiments relate, in general, to wireless communication and, in particular, to methods and apparatus for power efficient signal broadcasting and communication.

BACKGROUND

As a wireless service to mobile users, the transmission of multimedia is becoming as important as voice connectivity. It is forecasted that multimedia applications will include interactive data services such as gaming and internet access as well as on-demand video and audio services.

Digital video and audio broadcasting and multicasting are one class of wireless services. Some applications such as news-casting, sports-casting, and other types of multimedia entertainment require no or minimum interaction. The most efficient way to deliver these types of mass multimedia contents is broadcasting. Given these broadband wireless applications, the platform for the next generation wireless communications should deliver interactive data and broadcasting services at the same time. The design of such a platform with mixed applications must be well balanced, optimizing quality of service, efficiency, power consumption by mobile stations, etc.

A mobile station in continuous reception of a video broadcasting stream consumes significant amount of power, which becomes even a bigger challenge if the mobile station is running on battery. Furthermore, when data application traffic shares the same air link resource with the video streams, a video burst that utilizes the entire air link resource will cause a long delay for other applications such as for Transmission Control Protocol (TCP). This can become a major problem if some control data transmissions require swift responses, such as power control, hybrid automatic retransmission request (HARQ) feedback and channel quality information (CQI) measurement reports. The exclusive use of a resource for video broadcasting blocks these control messages and causes system performance problems.

SUMMARY

A method for receiving broadcast information in an orthogonal frequency division multiplex (OFDM) communication system may comprise receiving, by a mobile station, a periodically broadcast scheduling message from a base station. The periodically broadcast scheduling message may be an OFDM signal which indicates for each type of a plurality of types of broadcast information included in broadcast information, a pattern of frames to monitor for the type of broadcast information. The periodically broadcast scheduling message may also indicate a length of time to monitor. The method may further comprise monitoring and receiving, by the mobile station, information for at least one of the plurality of types of broadcast information, based on the periodically broadcast scheduling message.

DETAILED DESCRIPTION OF THE PREFERRED EMBODIMENTS

Figure 1:
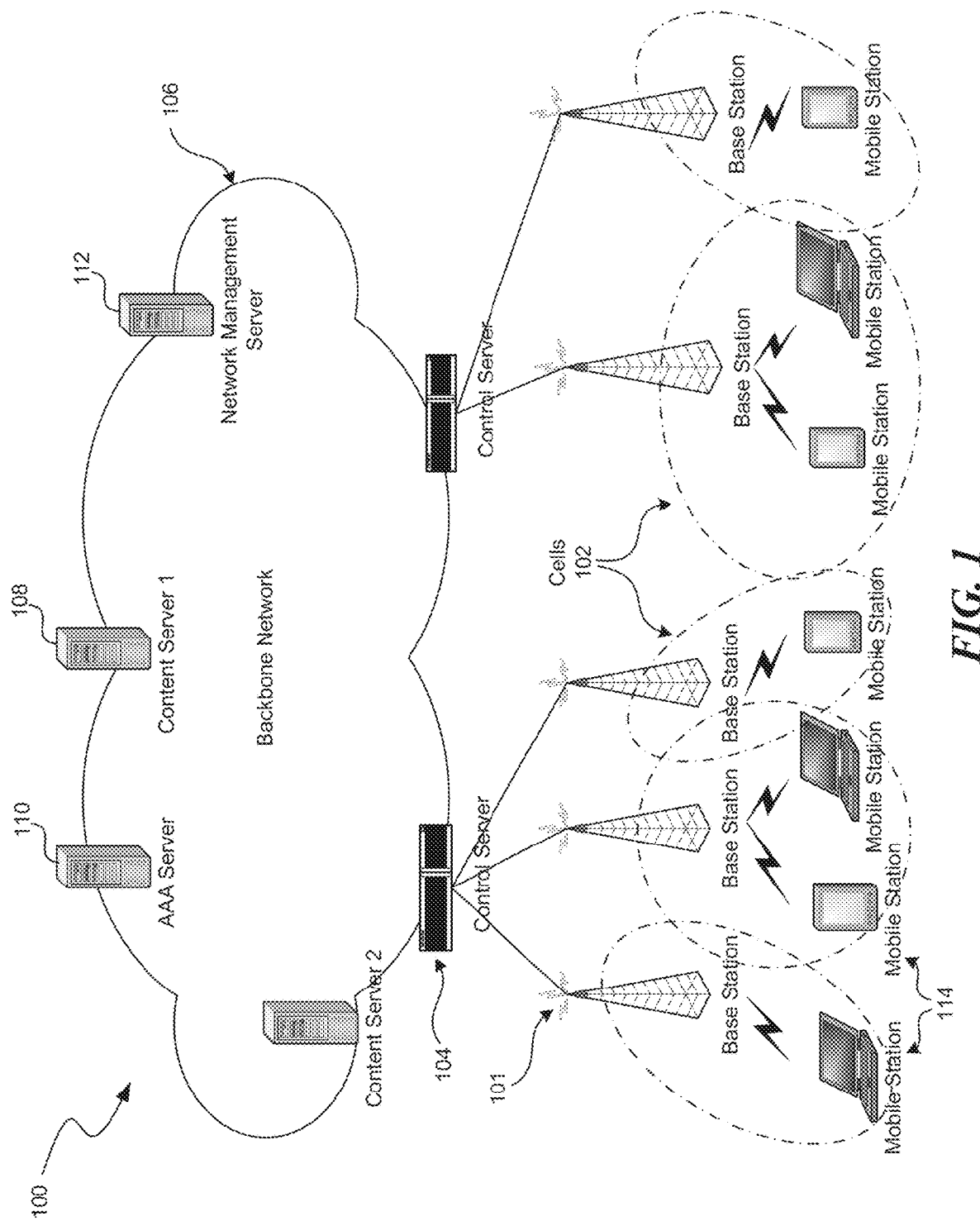
FIG. 1 illustrates examples of a system architecture of a cellular wireless system.

Methods and apparatus are disclosed herein for resource configuration in a cellular broadcasting and communication network of base stations and mobile stations. In this network a video stream can be transmitted from a base station to a mobile station as bursts of video and data frames are configured in a particular sequential manner. Special scheduling signals are designed to efficiently announce video burst information to the subscribing mobile stations, allowing the mobile stations to turn on their transceiver circuitry only when video bursts arrive. In a video burst, the available data resources, in addition to video resources, are used to transmit data application packets and/or special control information to the subscribing mobile stations. Methods and processes are also disclosed for a mobile station to use a single RF tuner within a system with multiple frequency bands.

The disclosed multiple access technology can be of any special format such as Code Division Multiple Access (CDMA), Time Division Multiple Access (TDMA), Frequency Division Multiple Access (FDMA), Orthogonal Frequency Division Multiple Access (OFDMA), or Multi- Carrier Code Division Multiple Access (MC-CDMA). Without loss of generality, OFDMA is employed as an example to illustrate the present invention. The system can also be either time division duplex (TDD) or frequency division duplex (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

In order to minimize the power consumption of a mobile station, it is desirable to deliver video broadcasting data within a short period of time and fill up a video buffer of the mobile station (MS) so that it can be played back later. This only requires the radio frequency (RF) and the base-band transceivers of the mobile station to be powered up during the same short period. The rest of the time the transceiver can be shut down; minimizing the power consumption. Implementing such scheme, in a system with other types of data application, requires harmonizing various applications and optimizing the results.

In one embodiment, to reduce the power consumption of a receiving mobile station, a video stream is transmitted from a base station (BS) as bursts of video and data frames configured in a particular sequential manner. A mobile station can turn off its transmitting and receiving circuits during the periods between the video bursts. In a video burst, the available data resources, in addition to video resources, are used to transmit data application packets and/or special control information. Special scheduling signals are designed to efficiently announce video burst information to the subscribing mobile stations.

A video broadcasting application is used as an example to illustrate some aspects of the invention. More generally, the disclosed methods and apparatus can be applied to other applications that use broadcasting or multicasting and benefit from buffering data and playing it back to save power. Examples are music/audio broadcasting and multicasting-based data downloading. On the other hand, "data application" refers to other applications with non-broadcasting/multicasting nature, such as web access, voice over IP, and FTP.

Throughout the following specification, examples of a single frequency network (SFN) are used to illustrate the applications of video broadcasting; however, employing a SFN is not a requirement.

Cellular Broadcasting and Communication Systems

FIG. 1 depicts a typical wireless network 100, where there are a plurality of base stations (BS's) 101 each of which provides coverage to its designated area, normally called a cell 102. If a cell 102 is divided into sectors, from system engineering point of view each sector itself can be considered to be a cell. Therefore, the terms "cell" and "sector" are interchangeable in this context.

There is at least one control server 104 in a wireless network 100 for controlling one or multiple BS's 101. The control server 104 is connected to the BS's 101 via the backbone network 106, which can be either a wired network or a wireless network. The backbone network 106 can also be either a circuit switched network or a packet switched network. The backbone network 106 may connect to other servers in the system, such as a number of content servers 108, a number of network management servers 112, and/or a number of authentication/authorization/accounting (AAA) servers 110.

A BS 101 serves as a focal point to wirelessly distribute information to and collect information from its MS's 114, which are the communication interface between the users and the wireless network 100. The transmission from a BS 101 to an MS 114 is called a downlink and the transmission from an MS 114 to a BS 101 is called an uplink. The term "MS" also can represent a user terminal in a fixed wireless system or a portable device with a wireless communication interface.

In wireless applications such as digital video broadcasting, the SFN technology is used to alleviate the problem of interference between BS's 101. Using OFDM, BS's 101 simultaneously transmit the same broadcasting content while employing the same time/frequency resource. A receiver can then combine the received signals from different BS's 101 to boost its SNR (signal to noise ratio).

In the backbone network 106, the control server 104 coordinates the synchronized video broadcasting. When video stream packets are distributed from the control server 104 to the BS's 101, additional synchronization information is appended to the packets by a device called Distribution Adapter (DA). The video packet distribution network is built on top of the backbone network 106 via tunneling technologies.

For a video broadcasting packet, the BS 101 forwards the packet to a Receiving Adapter (RA), which extracts the synchronization information, and broadcasts the video simultaneously with other BS's 101.

Data application packets are transmitted to the BS 101 directly, without encapsulation, using tunneling protocols. The BS 101 separates data application packets from video broadcasting packets by their destination addresses and other properties. Data application packets bypass RA and are transmitted to MS's 114 according to a scheduling by each individual BS 101.

Video Frames

The physical media resource (e.g., radio or cable) in a multi-carrier communication system can be divided in both the frequency and time domains. This canonical division provides a high flexibility and fine granularity for resource sharing. The building-blocks of multi-carrier signals in the frequency domain are sub-carriers, a fixed number of which are within a particular spectral band or channel.

Figure 2:
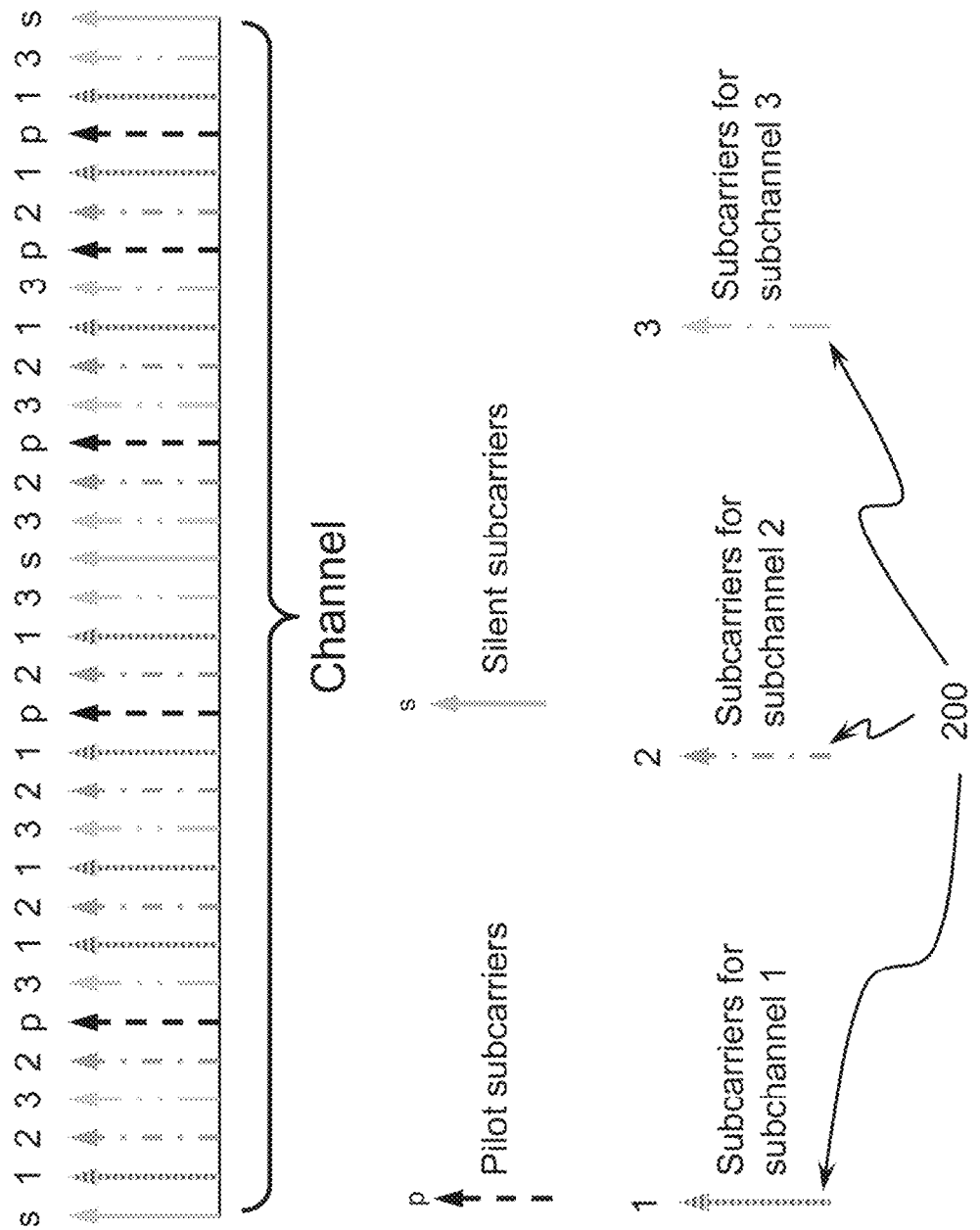
FIG. 2 illustrates an example of sub-carriers and sub-channels.

FIG. 2 depicts three types of sub-carriers, as follow:
1. Data sub-carriers 200, which carry information data;
2. Pilot sub-carriers, whose phases and amplitudes are predetermined and are made known to all receivers, and which are used for assisting system functions such as estimation of system parameters; and
3. Silent sub-carriers, which have no energy and are used as guard bands and DC carriers.

The data sub-carriers can be arranged in a particular manner into groups called sub-channels to support both scalability and multiple access. The pilot sub-carriers are also distributed over the entire channel in a predetermined manner. The sub-carriers forming one sub-channel are not necessarily adjacent to each other.

Figure 3:
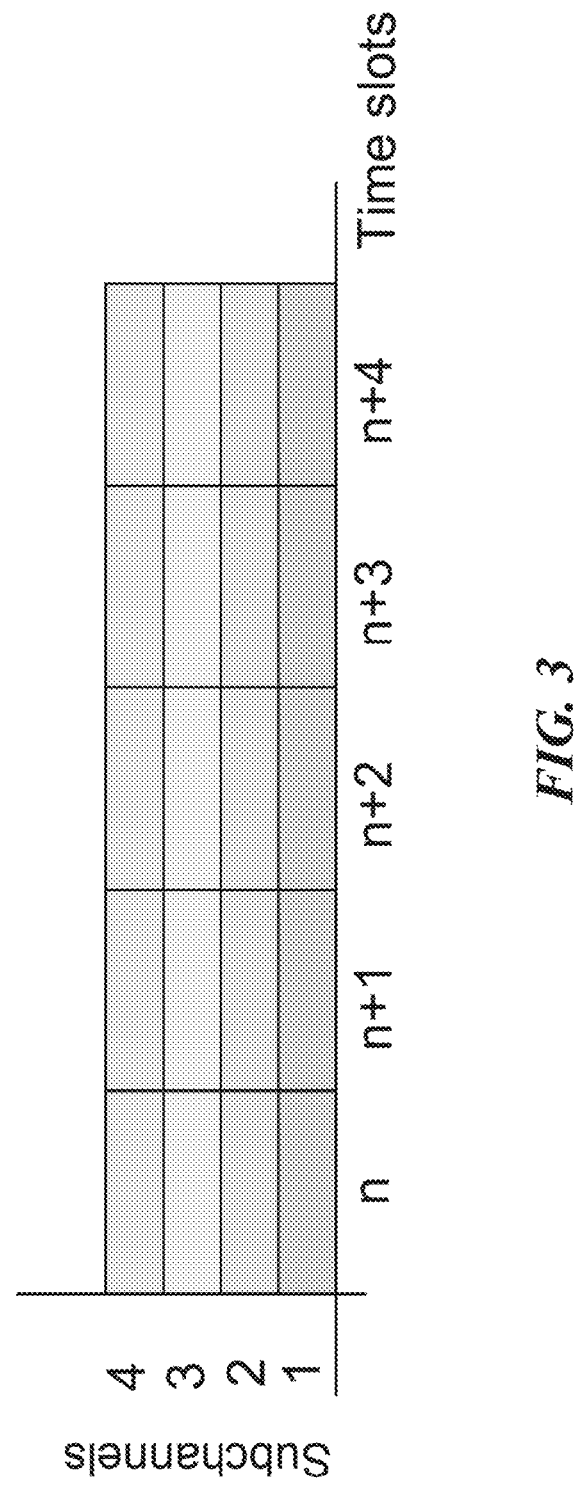
FIG. 3 illustrates an example of time and frequency resources.

The building-blocks of multi-carrier signals in the time domain are time slots to support multiple access. The resource division in both the frequency and time domains is depicted in FIG. 3, where the radio resource is divided into small units in both the frequency and time domains: sub-channels and time slots. The basic structure of a multi-carrier signal in the time domain is made up of time slots. A time slot may contain one or multiple OFDM symbols. A "frame," typically of a fixed length (e.g., 5 ms), may contain one or multiple slots.

In a broadcasting and communication system with a frame structure, the video broadcasting application and the data application use different air link resources. If SFN is used for the video broadcasting application, its reserved resource in a frame is called SFN video resource. A frame containing a video resource is called a video frame; otherwise, it is called a data frame.

Figure 4:
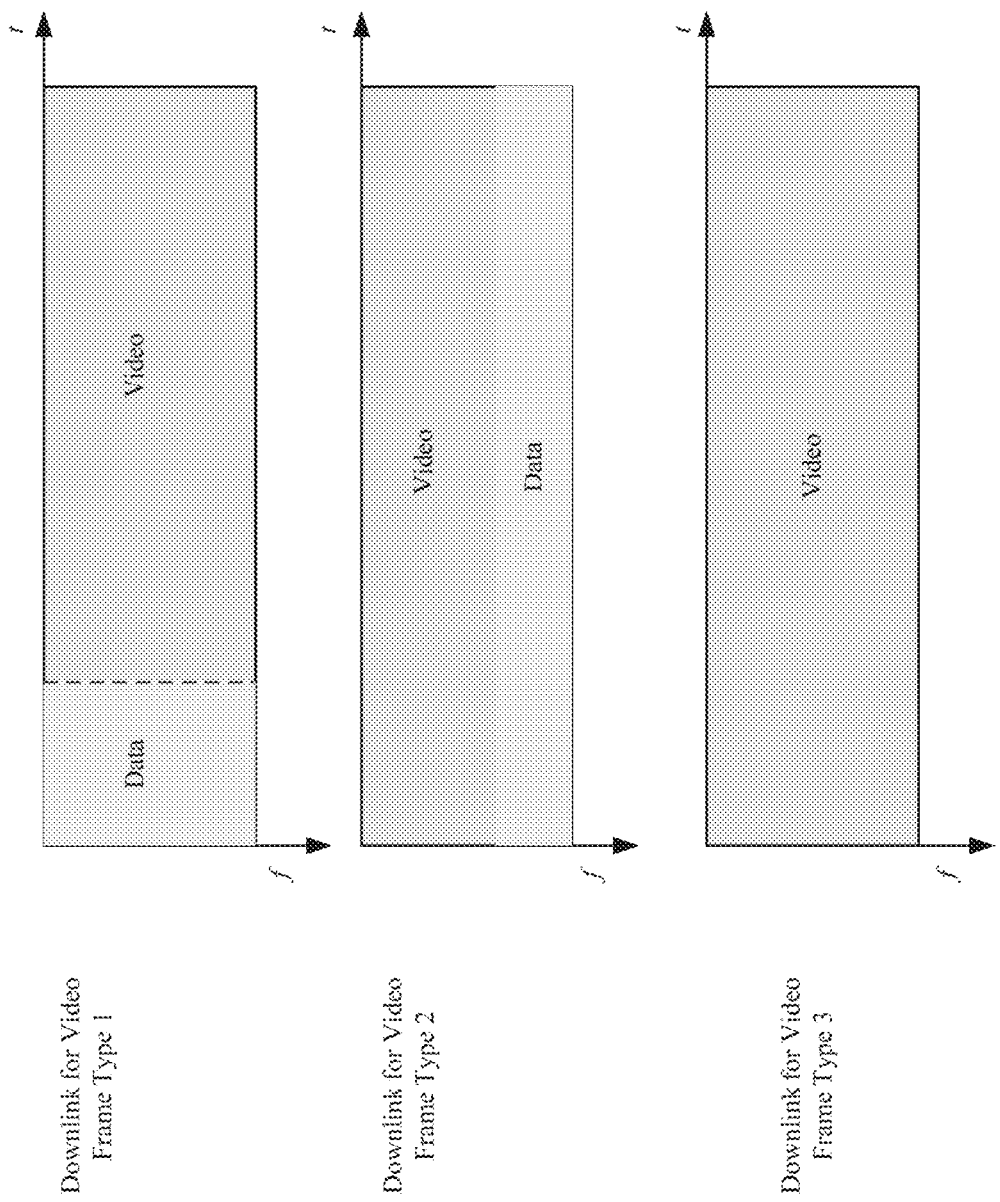
FIG. 4 illustrates three different types of video frames.

FIG. 4, while only illustrating the downlink, shows three different types of video frames. The first type contains both video and data resources. They are separated in the time domain using different OFDM symbols. In the second type frame, the video resource and the data resource are using different sub-carriers. The third type contains only the video resource.

A video broadcasting "stream" is defined as a stream for a particular video broadcasting program. For example, one stream carries CNN news channel program, the other carries video broadcasting information from FOX.

Each video stream is associated with a bit rate, which can be either fixed or variable. In order to support a certain bit rate, the number of video frames per second is derived based on the calculations of the video resource capacity. As an example, a system with an 8-MHz wireless channel and a 5-ms frame is used herein to illustrate the disclosed embodiments. It is further assumed that the system is sampling at 10 MHz and using 1024-point FFT. This example of a system's effective bandwidth is comprised of 600 OFDM sub-carriers. Each symbol in the system lasts about 100 ns; therefore, it has a total of 50 symbols within each frame.

In one embodiment, a frame is used either entirely or partially for video broadcasting. For example, the entire frame (all 50 symbols) is used for video broadcasting with 16QAM modulation and ½-rate coding, resulting in a frame capacity of $2 \times 600 \times 50 = 60K$ bits. With N video frames per second, the video stream bit rate is 60 N Kbps. If a video stream requires 240 Kbps throughput, a burst of 4 video frames every second is enough. In contrast, if only a part of the frame, for example six symbols, is used as video resource, with the same 16-QAM and ½ rate coding, the video capacity per frame is $2 \times 600 \times 6 = 7.2K$ bits, in which case the transmission of a 144-Kbps video stream requires 20 frames per second.

Video Burst

A video burst is defined as a sequence of frames within a short period of time. For one video stream, the duration between the two consecutive video bursts is relatively longer than the length of the video burst itself. To reduce the power consumption of a receiving MS 114, a video stream can be transmitted from the BS 101 as video bursts configured in a particular sequential manner with both video and data frames. The temporal location and the configuration of a video burst are announced by a special message carrying the scheduling signal, wherein the special message is broadcasted periodically.

Figure 5:
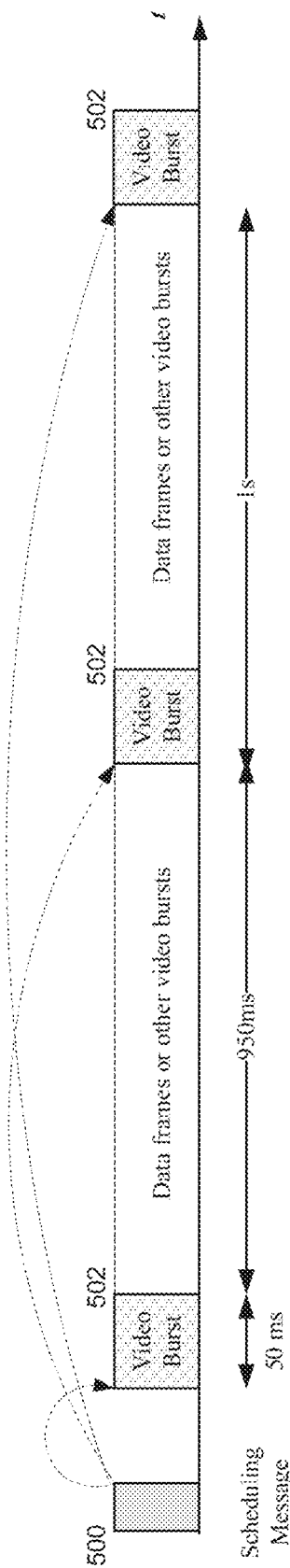
FIG. 5 illustrates video bursts along with a scheduling message pointing to their positions.

FIG. 5 illustrates the relationship of video bursts 502 with the scheduling message 500. The video burst takes about 50 ms, with a gap of 950 ms between two video bursts. The scheduling signal indicates the location of the video bursts as well as other control information. The format of the scheduling signal and its transmission mechanism is discussed below.

Figure 6:
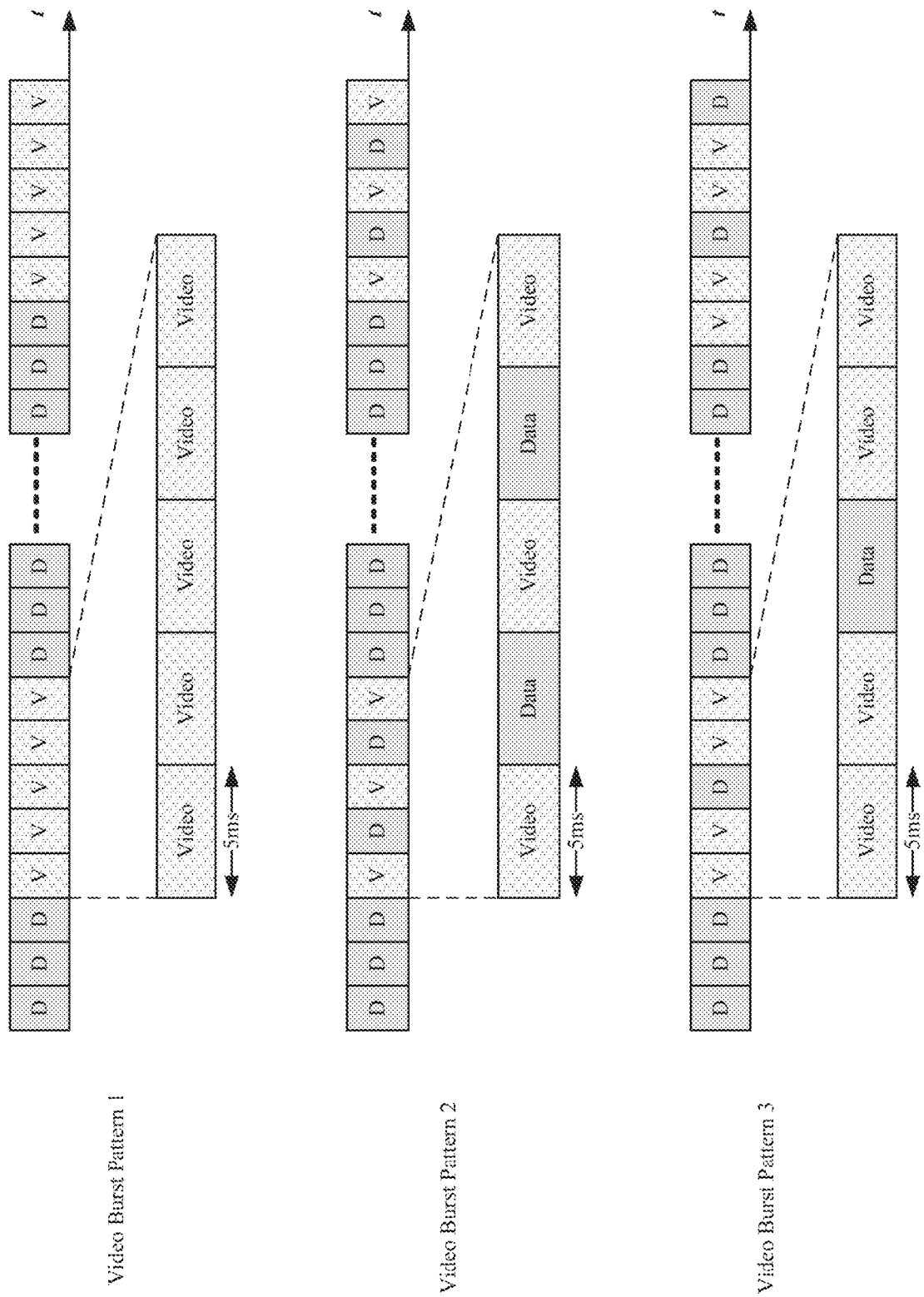
FIG. 6 illustrates different video burst patterns for a single video stream.

FIG. 6 illustrates three examples of "video burst patterns" for a single video stream, where video burst patterns are the interleaving video and data frames within a video burst. Different video burst patterns may be used, depending on the nature of the data applications. In the first pattern, a video burst has five consecutive video frames. In the second pattern the video burst has three video frames and, to mitigate the latency impact on the data applications, there is a data frame between the first and the second video frame and another data frame between the second and the third video frame. In this pattern the maximum latency between two neighboring data frames is only 5 ms, and the entire video burst lasts $5 \times 5 = 25$ ms. In the third depicted pattern the video burst has 4 video frames with a data frame between the second and the third video frame. With this pattern, the maximum delay between two neighboring data frames is 10 ms. The total video burst lasts 25 ms.

Transmitting a video stream by video bursts can reduce the power consumption of the receiving MS's 114. With such arrangement, each MS 114 can turn on its RF and base-band circuit to receive a video burst and shut them down subsequently to save power for a relatively long period, until the arrival of a next burst. The video burst pattern and its schedule is announced to all the receiving MS's 114 using scheduling signal. The video burst pattern for a video stream can be reconfigured over time. The pattern change is also announced to all the receiving MS's 114 through the scheduling signal.

Within a video burst, the data frames and the data resource of the video frames are called "available data resource." In one embodiment, the system can use the available data resource in a video burst to perform security key update, establishing network connection, paging, location update, resynchronization, or power control for the subscribing MS's 114.

In another embodiment, an MS 114 measures the receiving signal quality and collects statistics of the received video stream, such as the packet error rate. The BS 101 allocates a resource from the available data resource of the video burst for an MS 114 to report its CQI measurement and other statistics of the received video stream. When necessary, the MS 114 may be required to report which video stream it receives.

In yet another embodiment, since the receiving circuit in an MS 114 is turned on during its video burst, the BS 101 can notify the MS 114 about its newly arrived data application packets, using the available data resource in the burst. The MS 114 can also send uplink data packets to the BS 101 during the burst.

If there are only a small number of data application packets for downlink and uplink, the BS 101 and MS 114 can complete the transmission of data packets during a video burst. However, if the number of data packets exceeds the capacity of the available data resource in a video burst, the BS 101 and the MS 114 can coordinate to extend the power-on period to continue the data exchange.

Multiple Video Streams

Figure 7:
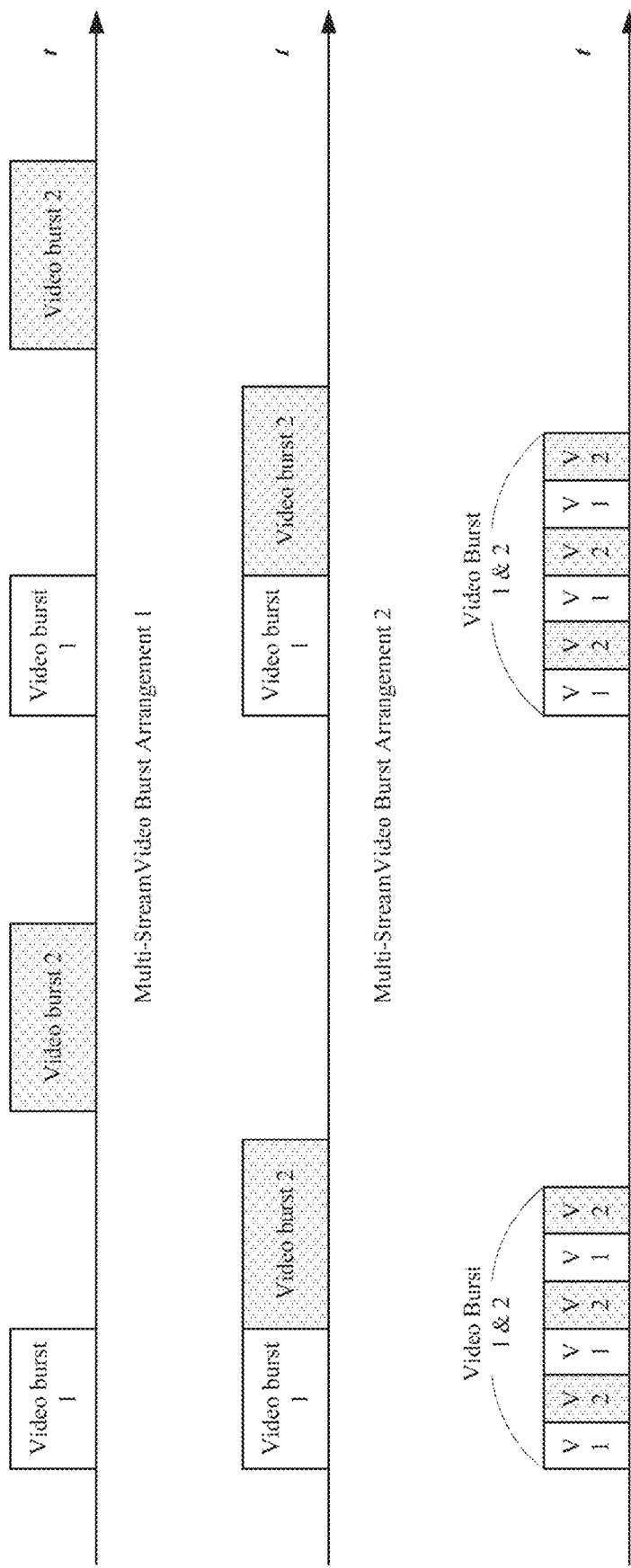
FIG. 7 illustrates different video-burst distributions for multiple video streams.

FIG. 7 depicts an embodiment wherein multiple video streams are transmitted with their own video bursts. The bursts associated with different video streams are evenly distributed, next to each other or overlapping/interleaving with each other. In the first example, Video burst 1 and Video burst 2 are evenly distributed over time. In the second example, Video burst 1 and Video burst 2 are next to each other. In the third example, Video burst 1 and Video burst 2 are overlapped and interleaved with each other.

In some systems, the number of supported video streams can change over time, which affects the video burst pattern and its distribution in the time domain. The video broadcasting resource in a system can be increased by:
1. increasing the number of video frames, while keeping the video burst pattern unchanged;
2. changing the video burst pattern so it contains less data frames; and/or
3. increasing the video resource in each video frame, which also affects the video burst pattern.

Figure 8:
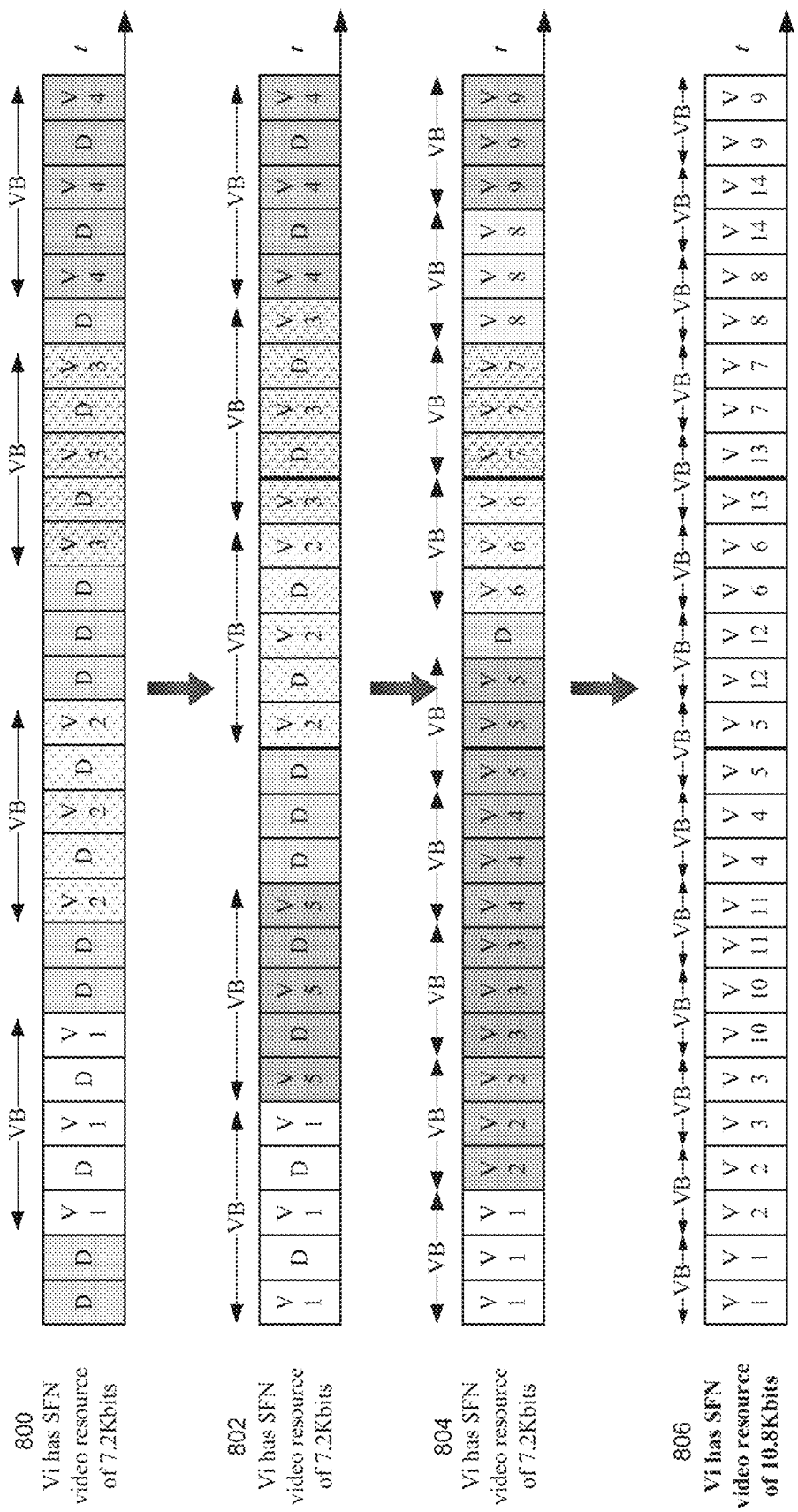
FIG. 8 illustrates an example of how a video burst and its video frame configuration change as the number of video streams increases.

FIG. 8 shows a number of system configuration transitions to increase video capacity. First, the data frames between video bursts in the configuration 800 are displaced by new video bursts in the configuration 802. Next, the data frames within the video bursts in configuration 802 are removed to reallocate resource to new video bursts in configuration 804. Finally, the video resource within the video frame increases from 7.2 Kbits in configuration 804 to 10.8 Kbits in configuration 806.

In one embodiment, in order to meet the video throughput demand as the number of video streams increases, the system replaces data frames with video frames to form video bursts. The video bursts for different video streams are still transmitted sequentially, possibly with some data frames in between.

In another embodiment, the video burst pattern for a particular video stream is configured in accordance with the overall video throughput demand. As the number of video streams increases, a video bursts pattern is changed into more video centric (i.e., the burst contains fewer data frames). On the other hand, as the number of video streams decreases, a video bursts pattern is changed into less video centric.

In yet another embodiment, the video resource in each video frame is adjusted to meet the video throughput demand. In a video frame, the video resource is augmented by displacing the data resource, either in the time domain or the frequency domain. In a TDD system, the uplink period in the video frame is also reduced if necessary, thereby increasing the downlink video/data resource.

Video Burst Scheduling Signal

In some embodiments the video burst schedule is announced to the subscribing MS's 114. In one embodiment, the video burst schedule is broadcasted periodically at a fixed time and frequency, either in a video frame or in a data frame. An MS 114 that loses the synchronization to the video burst can resynchronize to the burst sequence by decoding the scheduling information. If the video burst schedule changes, all the MS's 114 are to be notified at the earliest possible opportunity.

In another embodiment, the scheduling signal is transmitted in special resource regions. For example, a special message carrying the scheduling signal appears once every 10 seconds in the first data frame. Alternatively, the scheduling signal is transmitted using the first symbol of the video resource in the first video frame of a video burst.

In yet anther embodiment, a frame (sequence) number, which is known to all the control servers is used to represent a synchronized network time by being associated with a common time reference such as the GPS. Such a time reference is also critical to SFN operation. A modular number, instead of the absolute sequence number may be used to reduce the overhead of indicating the frame number.

The video burst scheduling signal may include the following control information for each video stream:
1. the frame number where each video burst starts;
2. the length of each video burst;
3. the pattern of each video burst;
4. the video resource region in each video frame of each video burst; and/or
5. the coding and modulation scheme for each video burst.

In one embodiment, some scheduling information is reduced or omitted or is broadcasted less frequently when it is already known, implied, inferred, or redundant. For example, if the video bursts of a video stream are broadcasted periodically and regularly and the video burst pattern remains unchanged, the scheduling signal is sent out infrequently, for example, once every 10 seconds. This greatly reduces the overhead of scheduling signals.

In another embodiment, to save the air link resource, the schedule information is compressed using a certain technique or be represented via a certain format. In particular, a finite set of video-burst patterns is predefined in the system. The mapping between the video burst patterns and their corresponding pattern indices is broadcasted in a message to all the MS's 114. The pattern index is used to indicate the pattern for each video burst. The mapping is implemented, for example, as in the table shown below:

| Pattern Index | Pattern Format |
|---|---|
| 0 | VDVDVDV |
| 1 | VVDVV |

Alternatively, the video burst pattern is expressed in the video burst scheduling signal using bitmap format. A bit of "1" stands for video frame and a bit of "0" stands for data frame or vice versa.

In yet another embodiment, a number of video streams are supported in the system. The mapping between the stream index and its associated video burst scheduling information is implemented, for example, as in the table shown below:

| Stream Index | Associated Scheduling Information |
|---|---|
| 1 | Start frame number: 20<br>Length of the video burst: 7<br>Video burst pattern bitmap: 0x55 (01010101B)<br>Start symbol No. for video resource: 2<br>Number of symbols for video resource: 8<br>MCS index for the video resource: 2 (QPSK ½ coding) |

-continued

Stream Index Associated Scheduling Information

| | |
|---|---|
| 2 | Start frame number: 40<br>Length of the video burst: 5<br>Video burst pattern bitmap: 0x15 (00010101B)<br>Start symbol No. for video resource: 0<br>Number of symbols for video resource: 6<br>MCS index for the video resource: 4 (16QAM ½ coding) |
| ... | ... |
| 10 | Start frame number: 180<br>Length of the video burst: 7<br>Video burst pattern bitmap: 0x55 (101010101B)<br>Start symbol No. for video resource: 1<br>Number of symbols for video resource: 12<br>MCS index for the video resource: 2 (QPSK ½ coding) |

In addition, an application layer message announces the content of the video stream associated with its index, as shown in the following table. Some of the content information, such as the channel and program names, can be used in a video program menu for the user. When a user selects a channel from the menu, the corresponding stream index signals the MS 114 to find the corresponding scheduling information for the video stream.

| Stream Index | Channel Name | Program Name |
|---|---|---|
| 1 | FOX | The Simpsons |
| 2 | CNN | News Update |
| ... | ... | ... |
| 10 | ESPN | Sports Update |

Forward Error Correction for Video Burst

In one embodiment, the FEC (Forward Error Correction) coding block comprises information bits from multiple consecutive video frames within a video burst. Coding across video frames can increase time diversity and therefore improve the performance over fading channels.

Figure 9:
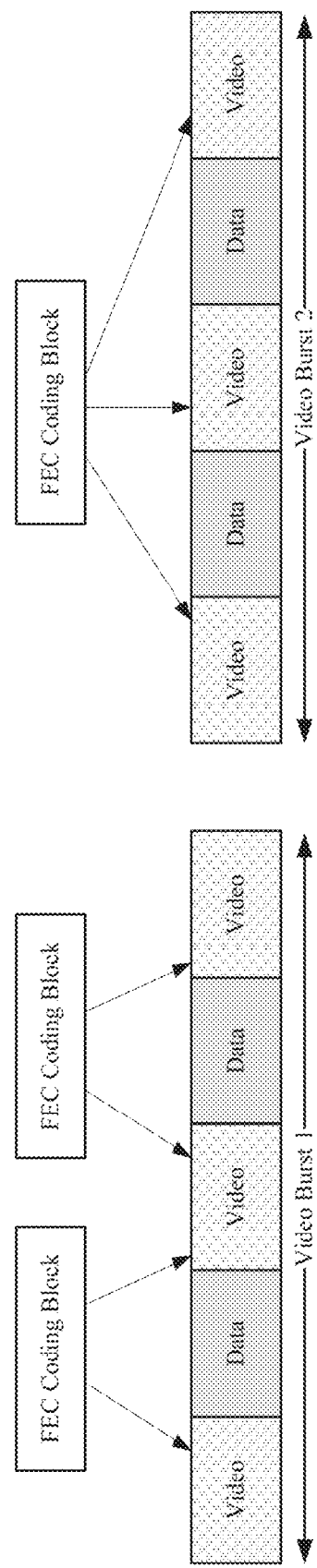
FIG. 9 illustrates an example of FEC (Forward Error Correction) coding configurations with multiple video frames within a video burst.

FIG. 9 illustrates the FEC coding configurations with multiple video frames within a video burst. A coding block in Video burst 1 may consist of bits from two neighboring video frames and a coding block in Video burst 2 may comprise bits concatenated across three neighboring frames.

Auxiliary Video Burst

When additional transmission capacity in either the time or the frequency domain is available, auxiliary video bursts (AVBs) may be used to deliver additional information to enhance video broadcast signals.

In one embodiment, an AVB is transmitted in a redundant form of the original video burst. An AVB can be a simple replica of a video burst itself and when an MS 114 receives the auxiliary video burst, it combines it with its original, using the Chase combining technique, to decode the video signals. An AVB can also carry incremental redundancy information of a video burst. In such a case, the MS 114 fuses the incremental redundancy information to the original video burst, using a predetermined algorithm, to decode the video signals. An MS 114 can elect to receive the video information in the AVB if an error has been detected in the original video burst. The announcement of the scheduling information should include additional information regarding the retransmission.

In another embodiment, an AVB is used to transmit additional video information to improve the video quality. An AVB can be transmitted by the individual BS 101 using multicasting. The BS 101 stores the additional video broadcasting information locally and, if the situation permits (e.g., light local traffic or additional bandwidth available), transmits them as the auxiliary video bursts. The BS 101 is responsible for announcing the scheduling information.

Figure 10:
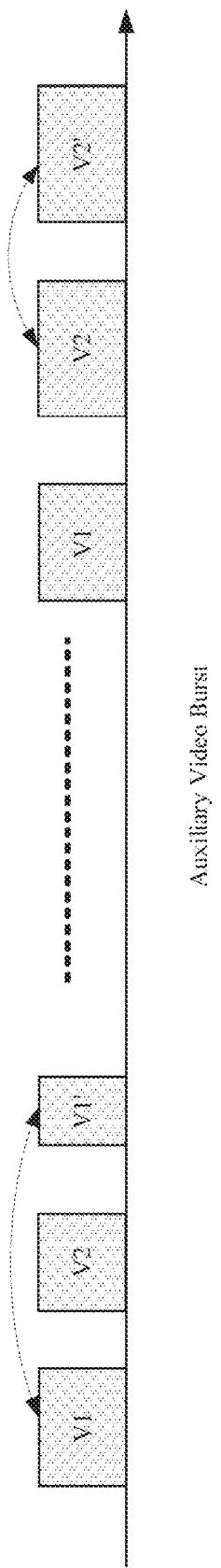
FIG. 10 illustrates how AVBs (auxiliary video bursts) are used with their original video bursts.

FIG. 10 shows an example of the use of AVBs. The MS 114 receiver will jointly decode V1 and V1' using an incremental redundancy algorithm. In the case where V2' is a repetition of V2, the MS 114 receiver uses, for example, the Chase combining algorithm to decode.

Designs for a System with Multiple Frequency Bands

In one embodiment frequency-switch methods and processes are used in a system with multiple frequency bands such that only one RF tuner is needed in the receiving MS 114. A single RF tuner implies that the receiver, regardless of its number of branches, operates in one single RF frequency. For example, some MS's 114 may have multiple branches in their receivers to implement a type of multiple antenna technology, such as diversity combining or multiple-input-multiple-output (MIMO) techniques, but they are referred to as one-RF-tuner receivers.

In another embodiment, when an MS 114 is to switch from a video stream in one frequency band to another video stream in a different frequency band, it triggers the inter-frequency handoff process. Triggering the inter-frequency handoff process hands off the data application associated with the original video stream to be in the switched frequency band.

In yet another embodiment, the data application continues to use the same frequency band when the video stream is switched to another frequency band. The BS 101 scheduler tracks the video frame for each MS 114 and makes resource allocation to avoid simultaneous delivery of the video stream in the video frequency band and other application data in a different data frequency band. The controller in the MS 114 receiver will switch from its data frequency band to video frequency band when its video frame arrives.

In yet another embodiment, when inter-frequency handoff for data application is required, the data application is switched to another frequency channel but the video stream continues transmitting in the original frequency band. The BS 101 scheduler tracks the video frame for each MS and makes resource allocation to avoid simultaneous delivery of the video stream in the video frequency band and other application data in a different data frequency band. The controller in the MS 114 receiver will switch from its data frequency band to video frequency band when its video frame arrives.

In still another embodiment, the system dedicates multiple frequency bands for the video broadcasting application and multiple frequency bands for other applications such as data. In this case an interleaving video frame pattern, called mixed video burst pattern, is used. The mixed video burst pattern will have video frames of different streams interleaved with each other, such as V1-V2-V1-V2-V1-V2. With this configuration, the controller in the MS 114 receiver will switch from its data frequency band to video frequency band when its video burst arrives. The BS 101 scheduler tracks the video frame for each MS 114 and makes resource allocation to avoid simultaneous delivery of the video stream in the video frequency band and other application data in the data frequency band.

Figure 11:
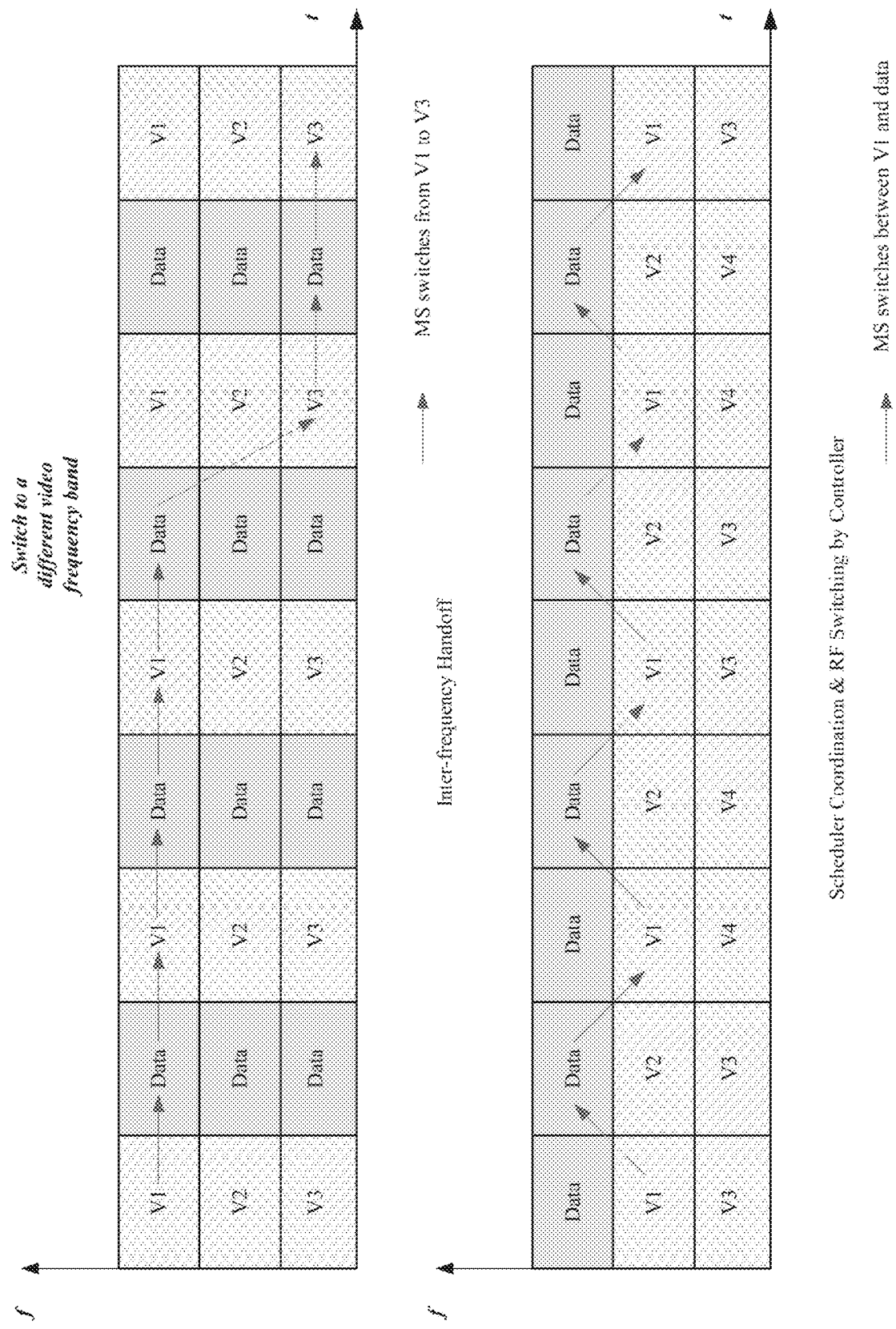
FIG. 11 illustrates using an RF tuner to receive both video and data in a multiple frequency band system.

FIG. 11 shows two examples of using one RF tuner to receive both video and data in a multiple frequency band system. In the first example, both the video and date applications are in a same frequency band. When switching to another video frequency band is requested, the MS 114 triggers the inter-frequency handoff process. In the second example, the video and data transmissions are carried out in different frequency bands. The controller in the receiver handles the switching between different frequency bands. The arrows in FIG. 11 indicate how the controller should switch between the frequency bands.

Figure 12:
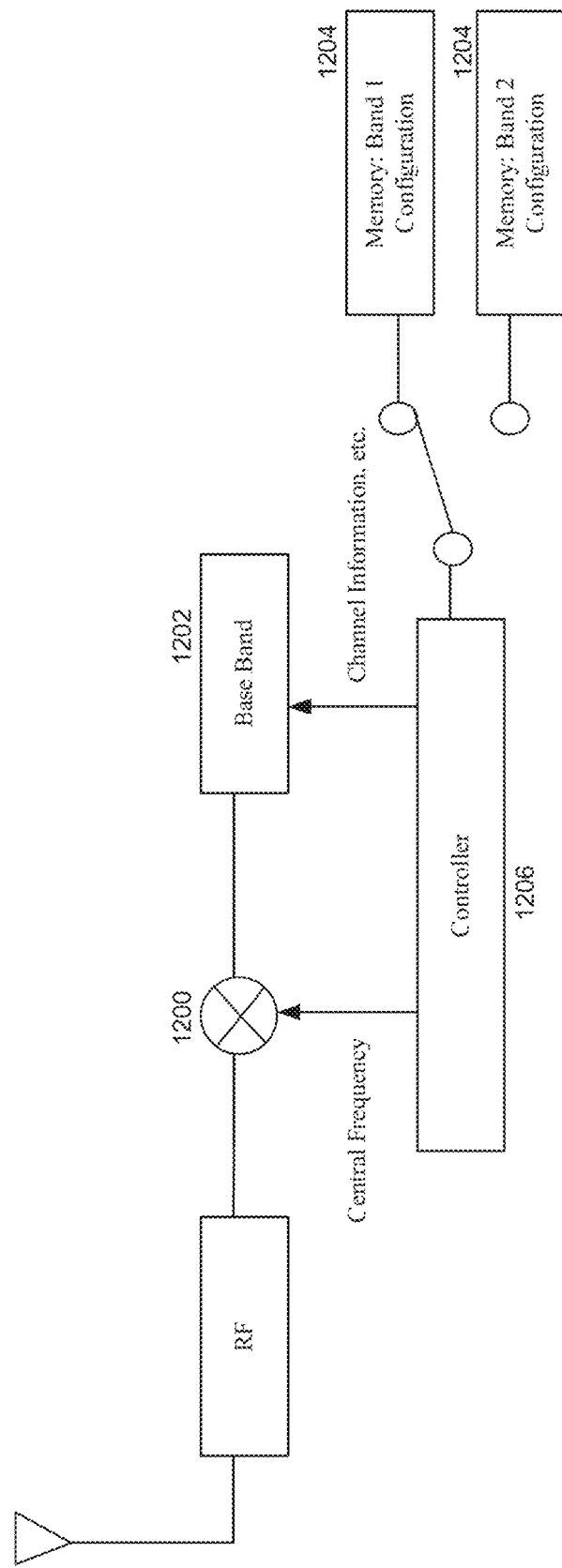
FIG. 12 illustrates a receiver with a single RF tuner in a multiple frequency band system.

FIG. 12 illustrates a receiver with a single RF tuner in a multiple frequency band system. The receiver stores, in its memory 1204, the synthesizer information and the previous channel information for both video frequency band and data frequency band. Based on scheduling information, a controller 1206 determines the switch point between these two frequency band configurations. Once the controller switches to the video frequency band configuration, it applies the control information to the mixer 1200 and the base-band processor 1202.

Receiving Operation

In a typical scenario, a user subscribes to a video broadcasting program, which corresponds to a particular video stream. The content provider and the network service provider will authenticate the request and admit the access by assigning to the MS 114 the key information as well as the video burst scheduling information.

In one embodiment, an MS 114 turns on its receiving and transmitting circuit(s) during its subscribed video bursts and turns off its circuit(s) during the periods in between video bursts. The received video burst is decoded and stored in a video buffer and is later played back on the display.

In another embodiment, an MS 114 with a single RF tuner operates within a multiple-frequency-band system and its controller switches and synchronizes to the data frequency band or the video frequency band when a data frame or a video frame arrives, respectively.

Figure 13:
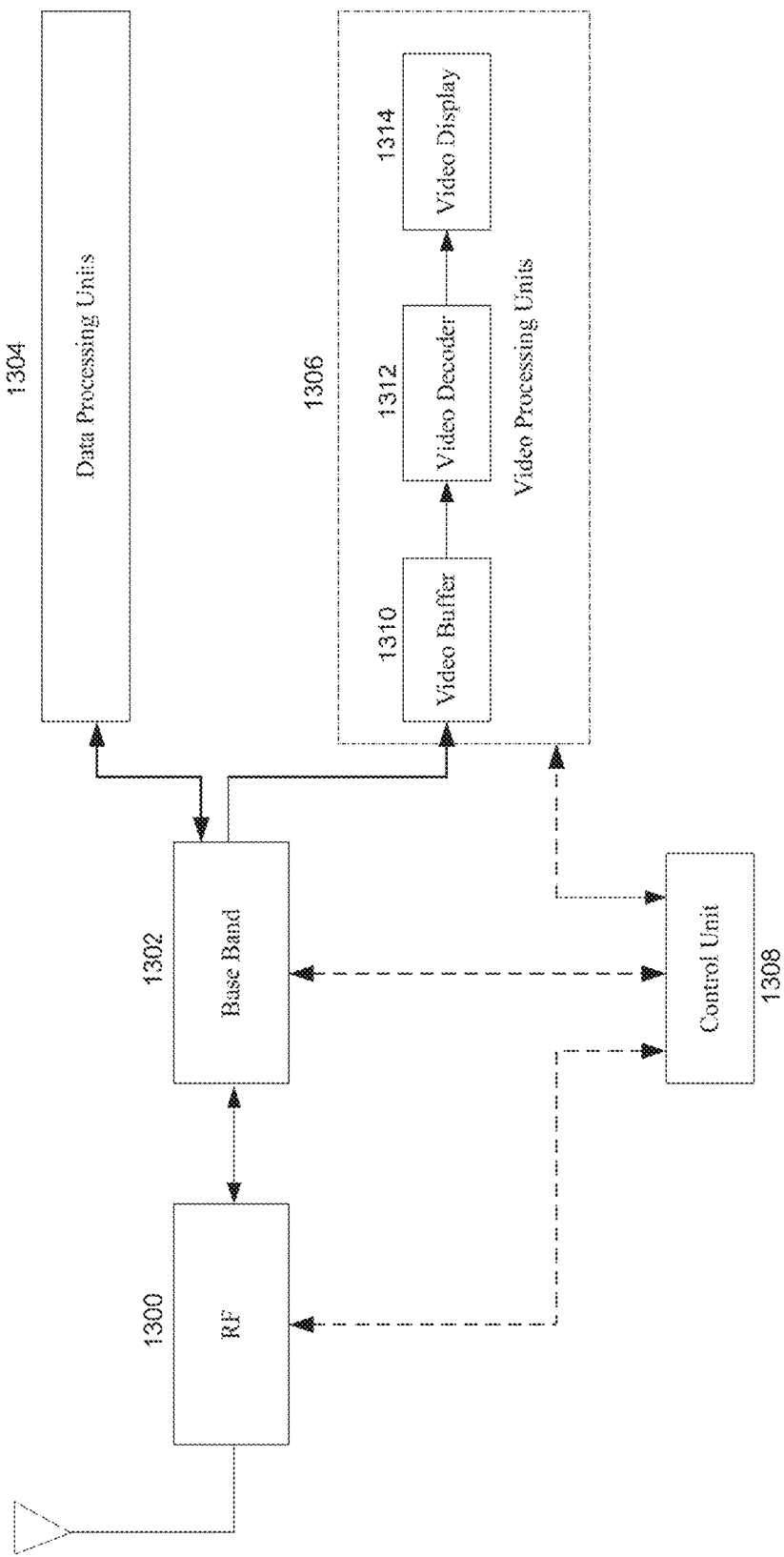
FIG. 13 illustrates a mobile station receiver in a broadcasting and communication system.

FIG. 13 illustrates an MS 114 receiver in a broadcasting and communication system. After the RF transceiver 1300 and base-band 1302 processing, the packets belonging to video broadcasting application are first stored in a video buffer 1310 and, after video decoding 1312, are played back on the video display 1314. Other data application packets are processed along a separate path by the data processing unit 1304. A control unit 1308 controls the RF transceiver 1300, base-band processor 1302, and the operation of the video processing units 1306.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A method for receiving broadcast information in an orthogonal frequency division multiplex (OFDM) communication system, the method comprising:
   receiving, by a mobile station having a single radio frequency (RF) tuner, a periodically broadcast scheduling message from a base station, on frequency resources of a first frequency, wherein the periodically broadcast scheduling message is an OFDM signal which indicates a pattern of frames to monitor and a length of time to monitor;
   determining channel quality information (CQI) by measuring a signal of the base station;
   transmitting the determined CQI based on at least information derived from within the periodically broadcast scheduling message, on frequency resources of a second frequency which is different than the first frequency, wherein the frequency resources of the second frequency are indicated by the periodically broadcast scheduling message; and
   receiving data on frequency resources of the first frequency.

2. The method of claim 1, wherein information received by the mobile station in accordance with the periodically broadcast scheduling message is time and frequency multiplexed with data transmissions.

3. The method of claim 1, wherein the periodically broadcast scheduling message indicates that a plurality of types of broadcast information are to be received together.

4. The method of claim 3, wherein one type of the plurality of types of broadcast information is video data information.

5. The method of claim 1, wherein the periodically broadcast scheduling message is periodically transmitted on same time/frequency resources.

6. The method of claim 1, wherein the periodically broadcast scheduling message indicates that one of a plurality of types of broadcast information is transmitted less frequently than another one of the plurality of types of broadcast information.

7. The method of claim 3, wherein at least one of the plurality of types of broadcast information includes information correlated to a neighboring base station.

8. A mobile station configured to receive broadcast information in an orthogonal frequency division multiplex (OFDM) communication system, the mobile station comprising:

a transceiver having a single radio frequency (RF) tuner;

the transceiver configured to receive a periodically broadcast scheduling message from a base station, on frequency resources of a first frequency, wherein the periodically broadcast scheduling message is an OFDM signal which indicates a pattern of frames to monitor and a length of time to monitor;

circuitry configured to determine channel quality information (CQI) based on a signal of the base station;

the transceiver configured to transmit the determined CQI based on at least information derived from within the periodically broadcast scheduling message, on frequency resources of a second frequency which is different than the first frequency, wherein the frequency resources of the second frequency are indicated by the periodically broadcast scheduling message; and the transceiver configured to receive data on frequency resources of the first frequency.

9. The mobile station of claim 8, wherein information received by the mobile station in accordance with the periodically broadcast scheduling message is time and frequency multiplexed with data transmissions.

10. The mobile station of claim 8, wherein the periodically broadcast scheduling message indicates that a plurality of types of broadcast information are to be received together.

11. The mobile station of claim 10, wherein one type of the plurality of types of broadcast information is non-video data information.

12. The mobile station of claim 8, wherein the periodically broadcast scheduling message is periodically transmitted on same time/frequency resources.

13. The mobile station of claim 10, further comprising:
transmitting a request for another type of information not included in the plurality of types; and
receiving the type of information requested.

14. The mobile station of claim 10, wherein at least one of the plurality of types of broadcast information includes information correlated to a neighboring base station.

15. A method for transmitting broadcast information in an orthogonal frequency division multiplex (OFDM) communication system, the method comprising:

transmitting, by a base station to a mobile station having a single radio frequency (RF) tuner, on frequency resources of a first frequency, a periodically broadcast scheduling message, wherein the periodically broadcast scheduling message is an OFDM signal which indicates a pattern of frames to monitor and a length of time to monitor;

transmitting, by the base station to at least the mobile station, a signal;

receiving, by the base station from the mobile station, channel quality information (CQI) based on the signal and information derived from within the periodically broadcast scheduling message, on frequency resources of a second frequency which is different than the first frequency, wherein the frequency resources of the second frequency are indicated by the periodically broadcast scheduling message; and transmitting data, by the base station to the mobile station, on frequency resources of the first frequency.

16. The method of claim 15, further comprising:
receiving, by the base station, synchronization information from a neighboring base station; and
transmitting, by the base station, data and pilot signals on a first subset of radio resources of the OFDM communication system and not transmitting data on a second subset of radio resources of the OFDM communication system in accordance with the synchronization information.

17. The method of claim 16, further comprising:
transmitting, by the base station, broadcast information correlated with the neighboring base station.

18. The method of claim 15, wherein the periodically broadcast scheduling message indicates that a plurality of types of broadcast information are to be received together.

19. The method of claim 15, wherein the periodically broadcast scheduling message is periodically transmitted on same time/frequency resources.

20. The method of claim 18, further comprising:
receiving, by the base station, a request for another type of information; and
transmitting, by the base station, the another type of information.

21. A base station comprising:
a transmitter configured to transmit to a mobile station having a single radio frequency (RF) tuner, on frequency resources of a first frequency, a periodically broadcast scheduling message, wherein the periodically broadcast scheduling message is an orthogonal frequency division multiplex (OFDM) signal which indicates a pattern of frames to monitor and a length of time to monitor;

the transmitter configured to transmit a signal to at least the mobile station;

a receiver configured to receive channel quality information (CQI) based on the signal and information derived from within the periodically broadcast scheduling message, on frequency resources of a second frequency which is different than the first frequency, wherein the frequency resources of the second frequency are indicated by the periodically broadcast scheduling message; and the transmitter configured to transmit data, to the mobile station, on frequency resources of the first frequency.

22. The base station of claim 21, further comprising:
the receiver configured to receive synchronization information from a neighboring base station; and
the transmitter configured to transmit data and pilot signals on a first subset of radio resources and not transmit data on a second subset of radio resources in accordance with the synchronization information.

23. The base station of claim 22, wherein at least one of a plurality of types of broadcast information transmitted by the base station includes information correlated with the neighboring base station.

24. The base station of claim 21, wherein the periodically broadcast scheduling message indicates that a plurality of types of broadcast information are to be received together.

25. The base station of claim 21, wherein the periodically broadcast scheduling message is periodically transmitted on same time/frequency resources.

26. The base station of claim 24, further comprising:
a receiver configured to receive a request for another type of information; and
the transmitter configured to transmit the another type of information.

27. A wireless communication system comprising:
a base station configured to transmit a periodically broadcast scheduling message on frequency resources of a first frequency, wherein the periodically broadcast scheduling message is an orthogonal frequency division multiplexing (OFDM) signal which indicates a pattern of frames to monitor and a length of time to monitor; and a mobile station, having a single radio frequency (RF) tuner, configured to receive the periodically broadcast scheduling message and determine channel quality information (CQI) based on at least information derived from within the periodically broadcast scheduling message and at least one signal transmitted by the base station;

wherein the determined CQI is transmitted, by the mobile station to the base station, on frequency resources of a second frequency which is different than the first frequency, and wherein the frequency resources of the second frequency are indicated by the periodically broadcast scheduling message.

28. The wireless communication system of claim 27, wherein the mobile station is configured to receive video data, from the base station, on frequency resources of the first frequency.

29. The wireless communication system of claim 27, wherein the periodically broadcast scheduling message indicates that a plurality of types of broadcast information are to be received together.

30. The wireless communication system of claim 27, wherein the periodically broadcast scheduling message is periodically transmitted on same time/frequency resources.

31. The wireless communication system of claim 27, wherein the periodically broadcast scheduling message indicates that one of a plurality of types of broadcast information is transmitted less frequently than another one of the plurality of types of broadcast information.

32. The wireless communication system of claim 31, wherein at least one of the plurality of types of broadcast information includes information correlated to a neighboring base station.

33. A method performed in a wireless communication system, the method comprising:

transmitting a periodically broadcast scheduling message, by a base station, on frequency resources of a first frequency, wherein the periodically broadcast scheduling message is an orthogonal frequency division multiplexing (OFDM) signal which indicates a pattern of frames to monitor and a length of time to monitor; and receiving the periodically broadcast scheduling message, by a mobile station having a single radio frequency (RF) tuner, and determining, by the mobile station, channel quality information (CQI) based on at least information derived from within the periodically broadcast scheduling message and at least one signal transmitted by the base station;

wherein the determined CQI is transmitted, by the mobile station to the base station, on frequency resources of a second frequency which is different than the first frequency, wherein the frequency resources of the second frequency are indicated by the periodically broadcast scheduling message.

34. The method of claim 33, further comprising:
receiving video data, by the mobile station from the base station, on frequency resources of the first frequency.

35. The method of claim 33, wherein the periodically broadcast scheduling message indicates that a plurality of types of broadcast information are to be received together.

36. The method of claim 33, wherein the periodically broadcast scheduling message is periodically transmitted on same time/frequency resources.

37. The method of claim 33, wherein the periodically broadcast scheduling message indicates that one of a plurality of types of broadcast information is transmitted less frequently than another one of the plurality of types of broadcast information.

38. The method of claim 37, wherein at least one of the plurality of types of broadcast information includes information correlated to a neighboring base station.

* * * * *